Aug. 31, 1943.  E. N. BASSETT  2,327,988
PIE PAN
Filed March 19, 1941  2 Sheets-Sheet 1
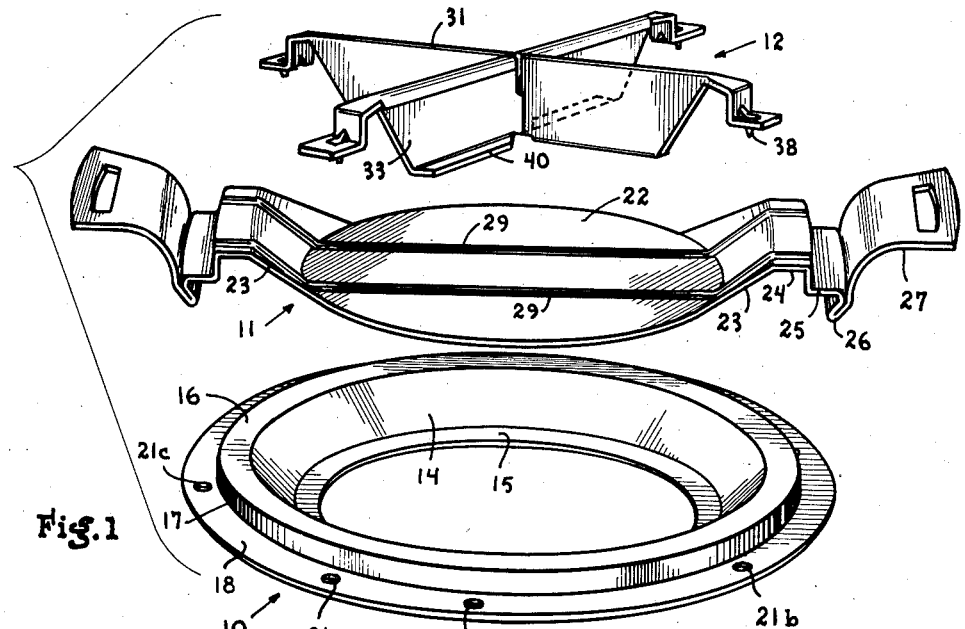
Fig.1
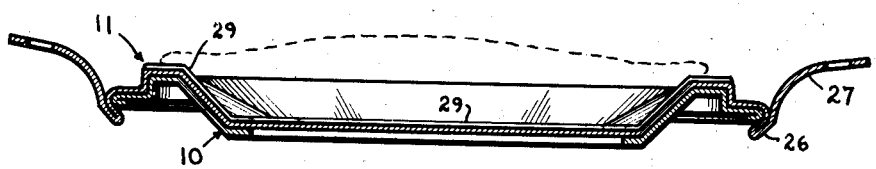
Fig.2
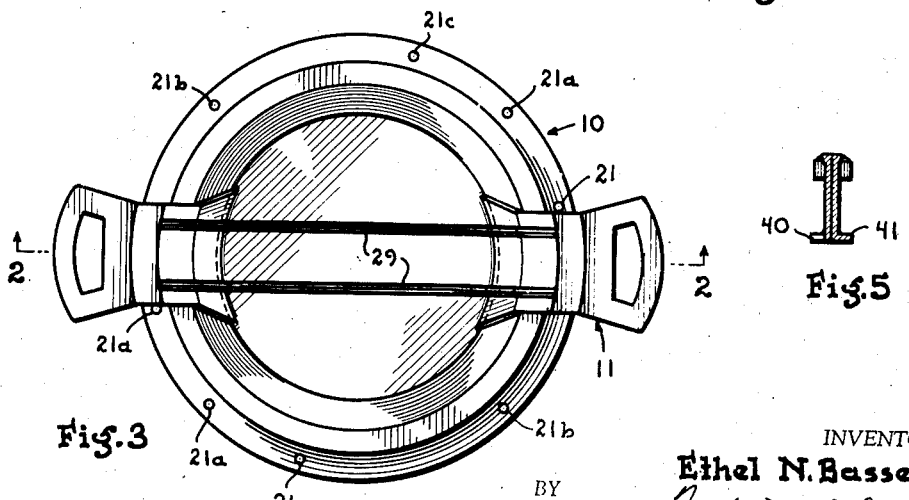
Fig.3
Fig.5
INVENTOR.
Ethel N. Bassett
Frederick E. Lange
ATTORNEY.

Aug. 31, 1943.　　　　E. N. BASSETT　　　　2,327,988
PIE PAN
Filed March 19, 1941　　　2 Sheets-Sheet 2
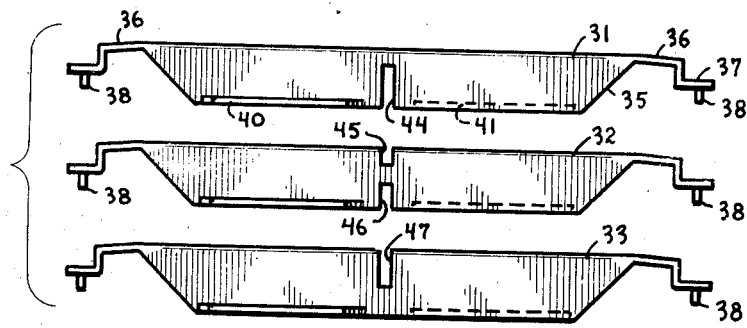
Fig. 4
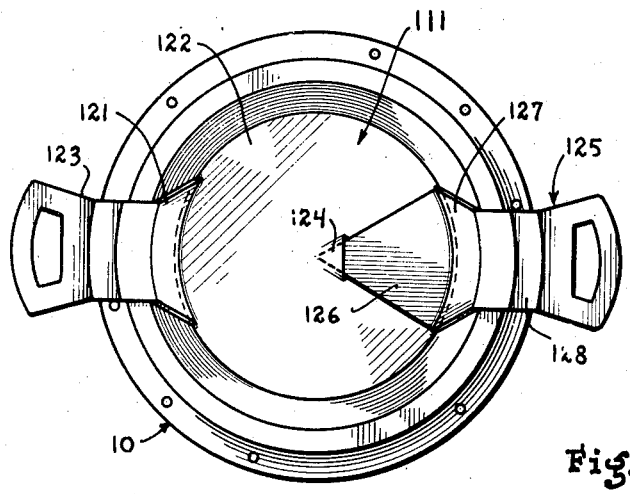
Fig. 7
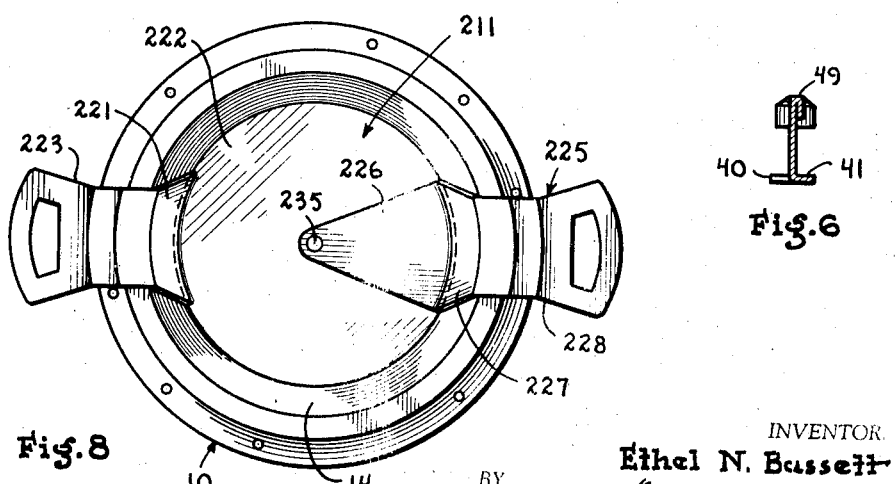
Fig. 6
Fig. 8
INVENTOR.
Ethel N. Bassett
BY Frederick E. Lange
ATTORNEY.

Patented Aug. 31, 1943

2,327,988

UNITED STATES PATENT OFFICE 2,327,988

PIE PAN

Ethel Nell Bassett, Lincoln, Nebr.

Application March 19, 1941, Serial No. 384,081

10 Claims. (Cl. 53—6)

The present invention is concerned with an improved pie pan and more particularly with one comprising two separable pieces of such shape as to facilitate the removal of the pie.

An object of the present invention is to provide an improved two-piece pie pan construction in which one section forms a rim and the other section a bottom and partial rim.

A further object of the present invention is to provide such an arrangement in which one of the sections is formed with portions adapted to serve as handles for the assembled pie pan.

A further object of the present invention is to provide such an arrangement wherein the sections are snapped together and can be released by manipulation of the handle portions.

A further object of the invention is to provide such a pie pan which is provided with a raised inner flange and a lower outer flange, the outer flange being adapted to support a pie guard.

A still further object of the present invention is to provide such an arrangement in which beading is provided for the purpose of preventing warping during the baking operation.

A still further object of the invention is to provide such a pie pan in which dividers may be employed so as to enable the division of the pie pan into any desired number of segments of regulated sizes.

A still further object of the invention is to provide such an arrangement in which one of the sections comprises two portions, one of which is designed to function also as a pie knife and server.

A still further object of the present invention is to provide such an arrangement in which one of the sections comprises two portions, one of which is adapted to be rotated to remove the pie from the other portion.

Other objects of the present invention will be apparent from a consideration of the accompanying specification, claims, and drawings, of which Figure 1 is an exploded view of my improved pie pan including two of the separators therefor, Figure 2 is a vertical sectional view of the assembled pie pan without the separators, Figure 3 is a plan view of the assembled pie pan without the separators, Figure 4 is an elevational view of the three separators, Figure 5 is a sectional view of one form of separator strip, and Figure 6 is a sectional view of a modified form of separator strip, Figure 7 is a plan view of a modified form of my pie pan, and Figure 8 is a plan view of a further modification of the pie pan.

Referring to the drawings, the reference numeral 10 is used to generally indicate the rim section of the pan, the numeral 11 the center or bottom section, and numeral 12 the dividers. These members are all formed of sheet metal by suitable stamping operations, and are designed to securely fit together as will be explained in more detail.

The outer or rim section 10 comprises a sloping wall portion or rim 14 of the usual configuration of a pie pan rim. At the lower innermost edge of section 14, the pie pan is shaped to provide a horizontal flange 15. At the uppermost outer edge of portion 14, the pie pan section 10 is formed so as to provide a horizontal flange 16. Proceeding outwardly, the section is then bent downwardly to form a cylindrical portion 17. At the lower end of this portion 17, the pie pan is again formed to provide a further horizontal flange 18. The edge of this flange is rolled over as shown in Figure 2. This horizontal flange is provided with a series of apertures 21. These apertures are designed to cooperate with the dividers 12 as will be more fully explained later. These apertures also serve as indicators for guaging portions when cutting pies, enabling anyone to divide a pie easily into accurate portions of the given standard servings. The horizontal flange 18 is intended to support a pie guard as will also be explained more fully.

The center section 11 comprises a circular base portion 22. Extending from this base portion are two inclined rim portions 23, corresponding in inclination to the rim 14. A horizontal portion 24 extends outwardly from each inclined rim portion 23 and is adapted to overlie the horizontal flange 16 of the rim section 10. The section is then bent downwardly forming a perpendicular flange and then outwardly to form a second horizontal portion 25. The section is then bent downwardly and inwardly to form a bead 26 and is then bent upwardly as at 27 to form a handle portion. The section 11 is further provided with beading 29 which extends from one perpendicular flange to the other. This beading is formed by a suitable stamping operation and may be stamped at the same time as the section is shaped to provide the various inclined and horizontal portions previously described. This beading may take any outline or position and serves to reinforce the center section and eliminate any danger of warping due to heat.

It will be understood that the members 10 and 11 are of somewhat resilient material. Because of this resilience, the beads can be moved sufficiently to enable sections 10 and 11 to be snapped together as shown in Figure 2. The two sections are thus held rigidly together until it is desired to separate them.

The separators 12 are best shown in Figure 4. There are three of these separators which are designated by the reference numerals 31, 32, and 33. Each of these separators is cut at each end to provide an inclined portion 35 corresponding in inclination to the rim 14. Each of these dividers is provided at each end with a pair of horizontal flanges 36 and 37 which are so spaced as to be adapted to seat upon the horizontal flanges 16 and 18 of the center section 10. Struck downwardly from the horizontal flange 37 is a tongue 38. These tongues are designed to enter the apertures 21 and fix the position of the dividers 31, 32, and 33. In order that the dividers may support themselves in a vertical position, they are provided at their base with oppositely directed flanges 40 and 41. The dividers 31, 32, and 33 are further provided with vertical slots 44, 45, 46, and 47. These slots are designed to cooperate with one another to permit the simultaneous placement of any number of the dividers in the pan. If only two dividers are used, as shown in Figure 1, then only dividers 31 and 33 are used. In assembling these two dividers, the unslotted portion of divider 31 extends into the slot 47 of divider 33 while the unslotted portion of divider 33 extends into the slot 44. Where divider 32 is also used, the slot 45 receives the unslotted portion of divider 31 and the slot 46 receives the unslotted portion of divider 33.

The dividers may be formed in either of two manners as shown in Figures 5 and 6, in which the thickness of the members is somewhat exaggerated for purposes of illustration. In the species of Figure 5, the metal is doubled over to provide a double thickness of metal throughout. On the other hand, the divider may be formed of a single thickness of metal as shown in Figure 6, but in this case, the upper edge is rolled over to form a bead 49. In either form, the flange and tongue structure is the same.

As previously indicated, the tongues 38 of the dividers are adapted to cooperate with the apertures 21. There are four pairs of these apertures 21 provided, these pairs of apertures being specifically designated by the reference numerals 21a, 21b, 21c, and 21d. Where it is desired to divide the pie pan into merely two sections, only one divider is employed. The tongues 38 of this divider can be placed in any of the pairs of apertures 21. For example, the tongues of the single divider may be placed in the apertures 21a. If it is desired to divide the pie pan into four sections, then two dividers are employed, as shown in Figure 1. These dividers will be associated with the apertures 21a and 21b, these two pairs of apertures being separated by ninety degrees.

If it is desired to use all three dividers so as to divide the pie pan into six sections, the pairs of apertures 21b, 21c, and 21d are employed, these three pairs of apertures being separated from each other by sixty degrees.

Use of pie pan

In using the pie pan, the cook snaps the two pieces 10 and 11 together by springing the beads 26 over the rolled edge of the outer flange 18. The two sections now form a rigid assembly as shown in Figure 2. If it is not desired to use all of the pan, or if it is desired to bake the pie in sections, one or more of the dividers 12 are inserted in the manner previously described. These dividers are firmly held in place by reason of the flanges 40 and 41, and by reason of the tongues 38 projecting into the apertures 21. After the pie ingredients have been suitably placed in the pie pan, a pie guard is placed upon the outer flange 18. Instead of relying upon formed pie guards of complicated and unsatisfactory construction, the cook need merely place on the flange 18 any convenient type of absorptive material such as a fibrous material. Such a pie guard performs the function of absorbing the expelled juices without resulting in charring and without any danger of the juices being deflected back into the pie to cause sticking of the pie to the pan.

After the pie has been baked, it can be removed from the oven by means of the handles 27. If in handling the pie one accidentally grasps the flange 18, no harm is done due to the fact that flange 18 is beneath the level of the pie. When it is desired to remove the pie all that it is necessary to do is to pull outwardly on the handles 27 and thereby release the beads 26 from the outer flange 18. This releasing in no way endangers the pie proper, due to the fact that any flexing of portion 11 only occurs in the overlying perpendicular flange through which the beading 29 does not extend. The beading 29 prevents any yielding in the remaining portion of base 11 on which the pie is supported. Upon beads 26 being released, the center section 11 can be removed with the pie from the rim section 10. It will be readily apparent that the pie can be easily removed from this section 11 due to the absence of any rim except for the inclined portions 23.

While two section pie pans have previously been devised, the present pie pan represents a marked improvement over these prior art pans. By reason of the double flange construction, the pie pan can be readily handled both during cooking and in disassembling the sections, without in any way endangering the pie. The double flange construction further provides a convenient means of supporting a pie guard. Furthermore, by providing two flanges, it is possible to have one of these flanges reenforced and to leave the other flexible to facilitate disassembling of the two sections.

Modification of Figure 7

The modification of Figure 7 is similar except for the center section 11. The rim portion 10 is identical to that of species 1 to 6 and need not be described further. The center section 111 differs from the center section 11 of the previously described species in that it consists of two separable portions, one of which is adapted to function also as a pie knife and server. The main portion of the center section 11 comprises a circular base 122, an inclined portion 121, and an integral handle portion 123. The base portion 122 corresponds to the base portion 22 of the previously described species, and the handle portion 123 together with the associated flanges, is identical to the handle portion of the previous species. The base 122 is provided with a portion 124 which is slotted and struck up or downwardly to form a pocket adapted to receive the locking tip-end of the combined handle and pie knife 125. This pie knife is, like the other portions of the pie pan, formed of sheet metal stamped to the desired shape. It comprises a sector portion 126, an inclined portion 127, and a handle portion 128. The inclined and handle portions 127 and 128 correspond to the inclined and handle portions 121 and 123.

During the entire baking operation, the two portions of the center section 111 function as a single unit in the same manner as the center section 11 of the previous species. After the pie is baked, however, and the center section has been removed, the pie knife portion 125 can be withdrawn from the main portion by withdrawing the pointed portion of the knife radially out of the pocket portion 124. This results in the inclined portion 121 being the only rim portion left of the pan. It is now extremely easy to remove the pie. Furthermore, the portion 125 serves as a knife for cutting and serving the pie.

*Species of Figure 8*

The species of Figure 8 is similar to the species of Figure 7 in that it has a center section 211 which is formed of two portions. The main portion of this center section 211 is identical to the main portion of the center section 111. Thus it has a circular base portion 222, an inclined portion 221, and a handle portion 223. Corresponding to the pie knife portion 125 of the species of Figure 7, there is a portion 225. This portion, instead of being removably secured to the main portion, is pivotally connected thereto at 235. This portion 225, like the portion 125, comprises a sector portion 226, an inclined portion 227, and a handle portion 228.

In use, the center section 211 functions as a single unit while the pie is being prepared for baking and during the baking operation. After the baking operation has been completed and the center section 211 has been removed with the pie from the rim section 10, the pie can be readily removed from the center section 211 by rotating the portion 225. Or if desired, the portion 225 can be rotated before the center section 211 is removed from the rim portion. This will loosen the pie from the rim 14 so as to facilitate the separation of the pie together with the center section 211 from the base portion 10.

Each of the three species described above incorporates the various advantages described in connection with the first species. All of these species employ two sections which snap together and which can be released by manipulation of handle portions. All of the species have the improved double flange construction with its many advantages. With any one of these species, one or more of the dividers 12 can be employed. While the reinforcing beading has been shown only in connection with the form of Figures 7 and 8, it will be obvious that similar beading could be provided in connection with Figures 8 and 9.

While I have described certain specific embodiments of my invention, it is to be understood that this is for purposes of illustration only and that the invention is limited by the scope of the appended claims.

I claim as my invention:

1. A pie pan comprising a rim section having a side wall and two outer horizontal flanges disposed at different levels, and a bottom section of resilient material having extensions overlying and of the same configuration radially as said rim portion for the full radial extent of said rim section, said extensions having beads adapted to project under and releasably grip the under side of the outermost of said flanges sufficiently firmly to hold said sections rigidly together.

2. A pie pan comprising a rim section having a side wall and two outer horizontal flanges disposed at different levels, and a bottom section of resilient material having extensions overlying and of the same configuration radially as said rim portion for the full radial extent of said rim section, said extensions having beads adapted to project under and releasably grip the under side of the outermost of said flanges sufficiently firmly to hold said sections rigidly together, and said bottom section being provided with reinforcement extending continuously between but not over the outermost portions thereof whereby said portions can be flexed to release said beads without flexing the portion normally supporting the pie.

3. A pie pan comprising a rim section having a side wall and two outer horizontal flanges disposed at different levels, and a bottom section of resilient material having extensions overlying and of the same configuration radially as said rim portion for the full radial extent of said rim section, said extensions having beads adapted to project under and grip the under side of the outermost of said flanges sufficiently firmly to hold said sections rigidly together, said flanges terminating in handles projecting beyond said rim section, and said bottom section being provided with reinforcement extending continuously between but not over the outermost portions thereof whereby said portions can be flexed by manipulation of said handles to release said beads without flexing the portion normally supporting the pie.

4. A pie pan comprising a rim section having a side wall and two outer horizontal flanges disposed at different levels, and a bottom section of resilient material having extensions overlying and of the same configuration radially as said rim portion for the full radial extent of said rim section, said extensions having beads adapted to project under and grip the under side of the outermost of said flanges sufficiently firmly to hold said sections rigidly together, said flanges terminating in handles projecting beyond said rim section to facilitate the carrying of said pie and the release of said beads.

5. A pie pan comprising a rim section having a wall and two outer horizontal flanges disposed at different levels, and a bottom section having extensions overlying and of the same configuration radially as said rim portion for the full radial extent of said rim section, said extensions having beads adapted to project under and grip the under side of the outer flange, said bottom section comprising two separate portions, one of which includes a circular base portion and one of said extensions, and the other of which includes a sector base portion and the other of said extensions.

6. A pie pan comprising a rim section having a wall and a relatively wide outer horizontal flange, a bottom section having extensions overlying and of the same configuration radially as said portion for the full radial extent of said rim section, said extensions having beads adapted to project under and yieldably grip the outer edge of said outer flange, said bottom section comprising two separate portions, one of which includes a complete base portion and one of said extensions integral therewith, and the other of which includes a partial base portion and the other of said extensions integral therewith, and means for securing said complete and partial base portions together so as to permit relative movement between them.

7. A pie pan comprising a rim section having a wall and a relatively wide outer horizontal flange, a bottom section having extensions overlying and of the same configuration radially as said portion for the full radial extent of said rim section, said extensions having beads adapted to project under and yieldably grip the outer edge of said outer flange, said bottom section comprising two separate portions, one of which includes a circular base portion and one of said extensions integral therewith, and the other of which includes a sector base portion and the other of said extensions integral therewith, and means for securing said complete and partial base portions together so as to permit relative movement between them.

8. A pie pan comprising a rim section having a wall and two outer horizontal flanges disposed at different levels, and a bottom section having extensions overlying and of the same configuration radially as said rim portion for the full radial extent of said rim section, said extensions having beads adapted to project under and grip the under side of the outer flange, said bottom section comprising two separate portions, one of which includes a circular base portion and one of said extensions, and the other of which includes a sector base portion and the other of said extensions, and means pivotally connecting said two portions together.

9. A pie pan comprising a rim section having a wall and two outer horizontal flanges disposed at different levels, and a bottom section having extensions overlying and of the same configuration radially as said rim portion for the full radial extent of said rim section, said extensions having beads adapted to project under and grip the under side of the outer flange, said bottom section comprising two separate portions, one of which includes a circular base portion and one of said extensions, and the other of which includes a sector base portion and the other of said extensions, said circular base portion having a slot into which the apex of said sector base portion is adapted to extend to hold said two portions together.

10. A pie pan comprising a rim section having a side wall and two outer horizontal flanges disposed at different levels, the outermost flange being lower than the innermost flange, and a bottom section of resilient material having extensions overlying and of the same configuration radially as said rim portion for the full radial extent of said rim section, said extensions having beads adapted to project under and grip the under side of the outermost of said flanges sufficiently firmly to hold said sections rigidly together, said flanges terminating in handles projecting beyond said rim section, and said bottom section being provided with non-intersecting reinforcing ridges extending continuously between but not over the outermost portions thereof whereby said portions can be flexed by manipulation of said handles to release said beads without flexing the portion normally supporting the pie.

ETHEL N. BASSETT.